(12) United States Patent
Omosako

(10) Patent No.: US 6,325,264 B1
(45) Date of Patent: Dec. 4, 2001

(54) VIDEO CASSETTE RECORDER

(75) Inventor: Toru Omosako, Daito (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/503,355

(22) Filed: Feb. 14, 2000

(30) Foreign Application Priority Data

Feb. 16, 1999 (JP) .................................................. 11-036734

(51) Int. Cl.$^7$ .............................. G03B 1/56; G11B 17/00
(52) U.S. Cl. ........................... 226/91; 226/194; 242/354; 360/95
(58) Field of Search .............................. 226/12, 91, 194; 242/354; 360/95, 85

(56) References Cited

U.S. PATENT DOCUMENTS

| | | | |
|---|---|---|---|
| 5,434,726 | * 7/1995 | Song | ........................ 360/85 |
| 5,833,109 | * 11/1998 | You | .......................... 226/194 X |
| 5,991,116 | * 11/1999 | Yoneda et al. | ...................... 360/85 X |
| 6,215,610 | * 4/2001 | Kim et al. | ............................. 360/85 |

* cited by examiner

Primary Examiner—Michael R. Mansen
(74) Attorney, Agent, or Firm—Armstrong, Westerman, Hattori, McLeland, & Naughton, LLP

(57) ABSTRACT

A video cassette recorder including a drive member 6 rotatingly drivable by a motor, and a slide member 7 reciprocatingly drivable by the rotation of the drive member 6. The slide member 7 is provided with a rib 71 for pushing a side face 55 of a tape drawing-out lever 54 with a movement of the slide member 7 in one direction to rotate the lever 54 toward a tape drawing-out direction. The slide member 7 and a pinch roller mechanism 8 have engaged portions provided with a cam mechanism for driving a pinch roller 19 toward a capstan 18 with a movement of the slide member 7 in the above-mentioned one direction subsequent to the movement thereof in this direction.

4 Claims, 10 Drawing Sheets

VIDEO CASSETTE RECORDER

FIELD OF THE INVENTION

The present invention relates to video cassette recorders (VCRs), and more particularly to a mechanism for drawing out the tape from a video cassette and pressing the tape against the outer peripheral surface of the capstan.

BACKGROUND OF THE INVENTION

With reference to FIG. 9, VCRs have mounted on a chassis 1 a VCR cylinder 11 incorporating a rotary magnetic head (not shown), and a pair of reel supports 12, 13 for drivingly rotating the two reels of a tape cassette 9. The chassis 1 is further formed at opposite sides of the VCR cylinder 11 with a pair of guide slots 14, 15 having slidably engaged therein a pair leading guides 16, 17 for winding a magnetic tape 91 in the tape cassette 9 around the outer peripheral surface of the VCR cylinder 11. A tape drawing-out lever 10 carrying a pin 10a for drawing out the magnetic tape 91 from the tape cassette 9 is supported at the right side of the VCR cylinder 11 so as to be pivotally movable between a tape drawing-out start position and a tape drawing-out completed position.

An unillustrated drive control mechanism drivingly advances the leading guides 16, 17 and pivotally moves the tape drawing-out lever 10 from the start position indicated in solid lines to the completed position indicated in chain lines, whereby the magnetic tape 91 is positioned along a predetermined tape transport path extending around a capstan 18.

A pinch roller mechanism (not shown) is thereafter operated, driving a pinch roller 19 toward the capstan 18, whereby the magnetic tape is nipped between the capstan 18 and the pinch roller 19. In this state, the tape is driven longitudinally thereof by the rotation of the capstan 18.

FIG. 10 shows a conventional tape drawing-out mechanism. Disposed on the rear side of a chassis is a drive control plate 4 reciprocatingly drivable by a motor (not shown). A tape drawing-out lever 2 is supported at its base end on a first pivot 20 projecting from the chassis. A drive lever 3 is supported at its base end on a second pivot 30 on the chassis. The lever 2 has a free end carrying a tape drawing-out pin 21 projecting therefrom and a driven gear portion 22 formed at its base end. On the other hand, the drive lever 3 as a drive gear portion 31 formed at a free end thereof and always meshing with the driven gear portion 22 of the drawing-out lever 2, and a cam follower 32 projecting downward from an intermediate portion thereof, extending through the chassis and engaged in a cam groove 41 in the drive control plate 4.

The drive control plate 4 rotates counterclockwise in the tape drawing-out mechanism, thereby causing the cam groove 41 of the plate 4 to drive the cam follower 32 of the drive lever 3 and rotating the drive lever 3 clockwise. With this rotation, the drive gear portion 31 of the drive lever 3 drivingly rotates the driven gear portion 22 of the tape drawing-out lever 2 clockwise to turn the lever 2 from a tape drawing-out start position to the tape drawing-out completed position shown. Consequently the magnetic tape is drawn out from the tape cassette and caused to extend along a predetermined path.

With the tape drawn out as shown in FIG. 10, the tension on the magnetic tape exerts a force F acting on the drawing-out pin 21 to rotate the drawing-out lever 2 counterclockwise. This force F is received by the meshing engagement of the driven gear portion 22 of the lever 2 with the drive gear portion 31 of the drive lever 3.

However, the driven gear portion 22, which is formed at the base end of the drawing-out lever 2, fails to effectively receive the force to result in the likelihood that the tape drawing-out pin 21 will move when the tape tension increases temporarily, for example, during fast forward transport of the tape. If the pin 21 moves, a problem such as loosening of the tape will arise.

The conventional VCR further has the problem of being composed of an increased number of parts because the drive member (drive control plate 4) for driving the tape drawing-out lever 2 and the drive member for driving the pinch roller mechanism are separate members.

SUMMARY OF THE INVENTION

Accordingly, an object of the present invention is to provide a video cassette recorder which is free of the likelihood of the tape drawing-out pin moving even in the event of great tension acting on the tape as drawn out and which is nevertheless reduced in the number of parts.

The present invention provides a video cassette recorder which comprises a tape drawing-out mechanism having a tape drawing-out lever 54 for drawing out a tape from a video cassette and positioning the tape along a predetermined tape transport path extending around a capstan 18, and a pinch roller mechanism 8 having a pinch roller 19 for pressing the tape against an outer peripheral surface of the capstan 18.

The video cassette recorder of the invention further comprises a drive member 6 drivingly rotatable by a motor, and a slide member 7 reciprocatingly drivable by the rotation of the drive member 6, the slide member 7 being provided with a pushing portion for pushing a side face 55 of the tape drawing-out lever 54 in sliding contact therewith with a movement of the slide member 7 in one direction to rotate the lever 54 toward a tape drawing-out direction, the slide member 7 and the pinch roller mechanism 8 having engaged portions provided with a cam mechanism for driving the pinch roller 19 toward the capstan 18 with the movement of the slide member 7.

With the video cassette recorder of the present invention, the tape drawing-out lever 54 is drivingly rotated by an advance of the slide member 7. In this process, the pushing portion of the slide member 7 first comes into sliding contact with a base end portion of the side face 55 of the lever 54 and thereafter pushes the lever 54 in sliding contact with the side face 55 thereof with the advance of the slide member 7 to rotate the lever 54. When the drawing-out lever 54 is rotated to a tape drawing-out completed position, the pushing portion of the slide member 7 retains the lever 54 bearing thereon at a portion of the lever side face 55 which portion is away from the lever base end and toward a lever free end. Accordingly, there is no likelihood that the lever 54 will rotate in a direction opposite to the tape drawing-out direction even if great tension acts on the tape.

The pinch roller 19 is driven toward the capstan 18 by a movement of the slide member 7 in the above-mentioned one direction subsequent to the movement thereof in this direction, whereby the tape is held between the capstan 18 and the pinch roller 19.

Stated more specifically, the tape drawing-out lever 54 is biased by a spring in a direction opposite to the tape drawing-out direction. When the slide member 7 is retracted, therefore, the lever 54 is reversely rotated by the action of the spring to return to a tape drawing-out start position. The cam mechanism drives the pinch roller mechanism 8 axially of the capstan 18 to reciprocatingly move the pinch roller 19 between a standby position away from the capstan 18 and a position opposed to the capstan 18.

In the recorder described specifically, the movement of the slide member 7 rotates the lever 54 to a tape drawing-out position, drawing out the tape from the tape cassette. The operation of the cam mechanism thereafter moves the pinch roller mechanism 8 from the standby position to the opposed position for the capstan 18 and the pinch roller 19 to hold the tape therebetween.

Further stated specifically, cam means is provided between the pinch roller mechanism 8 and the drive member 6, and the cam means is engaged when the pinch roller 19 is brought to the position opposed to the capstan 18. The cam means as engaged presses the pinch roller 19 in the opposed position against the capstan 18 with the rotation of the drive member 6.

With the arrangement described specifically, a cam face of the cam means remains spaced apart from a cam follower thereof, and there is no likelihood that the pinch roller 19 will be pressed against the capstan 18, until a time immediately before the pinch roller 19 is brought from the standby position to the opposed position, whereas the cam follower is brought into engagement with the cam face upon the pinch roller 19 reaching the opposed position, permitting the rotation of the drive member 6 to press the pinch roller 19 against the capstan 18. Consequently, the tape is pressed against the outer peripheral surface of the capstan 18.

With the video cassette recorder of the present invention described above, the tape drawing-out lever 54 has its portion toward the free end thereof retained by the slide member 7 in bearing contact therewith, with the tape drawn out by the lever, so that the lever 54 is unlikely to rotate in a direction opposite to the tape drawing-out direction even if the tape is subjected to great tension temporarily. Furthermore, the slide member 7 serves as a drive member for the tape drawing-out lever 54 and also as a drive member for the pinch roller mechanism 8. The present recorder is therefore smaller in the number of parts than in the prior art wherein separate drive members are used.

DETAILED DESCRIPTION OF EMBODIMENT

An embodiment of the invention will be described below in detail with reference to the drawings concerned.

Figure 7:
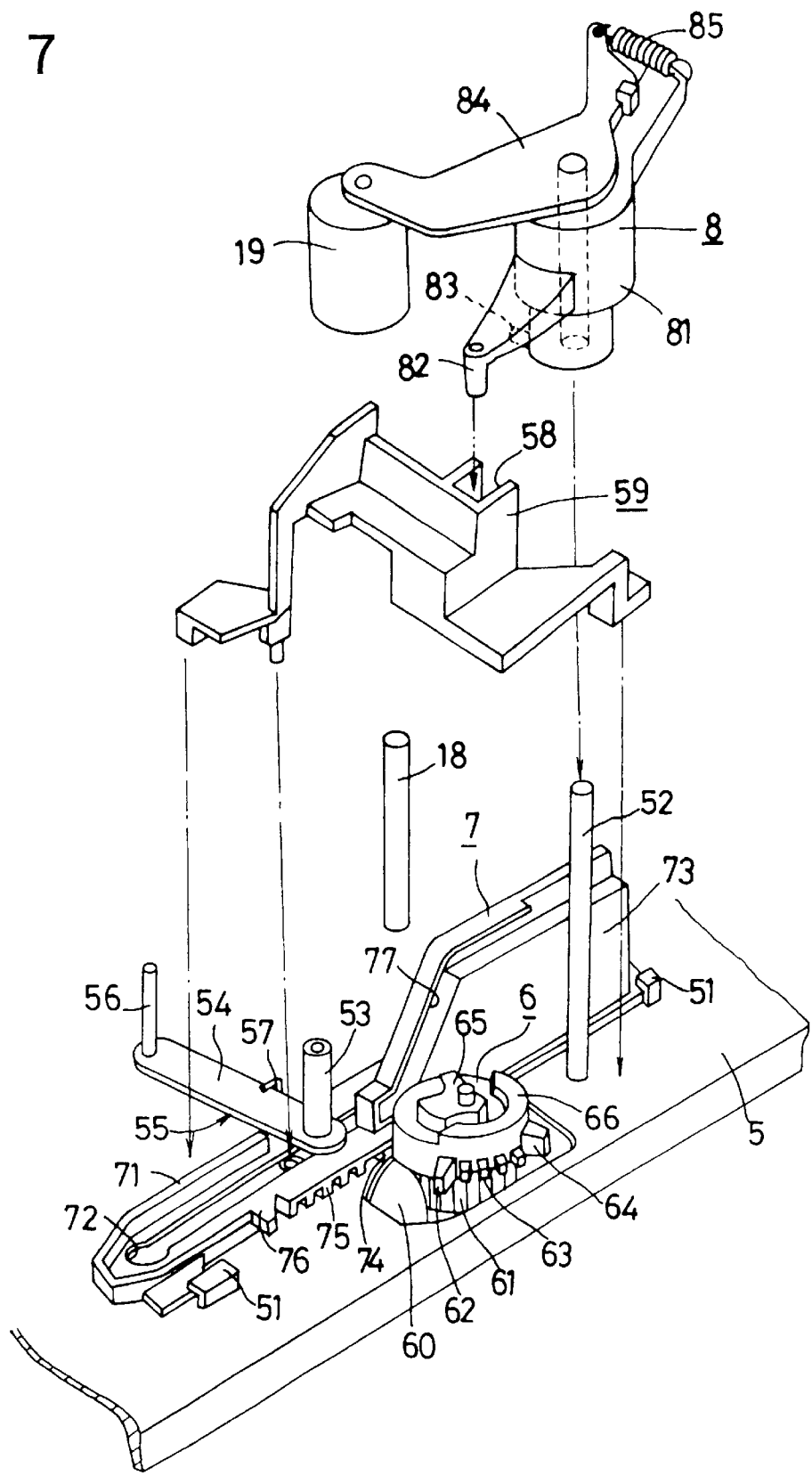
FIG. 7 is an exploded perspective view of the main assembly of the VCR of the invention.

Referring to FIG. 7 showing a video cassette recorder embodying the invention, a chassis 5 has a capstan 18 mounted upright thereon and drivingly rotatable by a capstan motor (not shown), and a tape drawing-out lever 54 turnably supported at its base end by a pivot 53. A magnetic tape can be drawn out from a tape cassette by a tape drawing-out pin 56 projecting from a free end of the lever 54. The drawing-out lever 54 is biased counterclockwise by a torsion spring 57.

A pinch roller mechanism 8 is vertically movably and pivotally movably supported by a post 52 provided upright on the chassis 5. The magnetic tape can be held between the capstan 18 and a pinch roller 19 rotatably supported by a free end of the pinch roller mechanism 8.

A drive gear 60 coupled to a loading motor (not shown) is provided on the rear side of the chassis 5 for driving the tape drawing-out lever 54 and the pinch roller mechanism 8. A guide piece 51 is provided at each of a plurality of locations on the chassis 5, and a slide member 7 is reciprocatingly movably supported by these guide pieces 51. A drive member 6 is disposed between the slide member 7 and the drive gear 60.

Over the slide member 7 and the drive member 6, an ascent-descent guide member 59 for guiding the upward and downward movement of the pinch roller mechanism 8 is mounted on the chassis 5.

The drive member 6 has a lower half portion providing a driven gear 61 meshing with the drive gear 60 at all times, and an upper half portion providing a disk portion 66. The disk portion 66 is provided on its outer periphery with a first pinion tooth 62, four intermediate pinion teeth 63 and a second pinion tooth 64 which are arranged in a circumferential direction for reciprocatingly driving the slide member 7. The disk portion 66 is formed on its upper surface with a cam 65 for pressing the pinch roller 19 against the capstan 18.

On the other hand, the slide member 7 has a slit 72 extending longitudinally thereof and having the pivot 53 inserted therethrough, and is provided, on the side face thereof opposed to the drive member 6, with a first rack tooth 74, five intermediate rack teeth 75 and a second rack tooth 76 meshable with the first pinion tooth 62, the intermediate pinion teeth 63 and the second pinion tooth 64, respectively.

Figure 8:
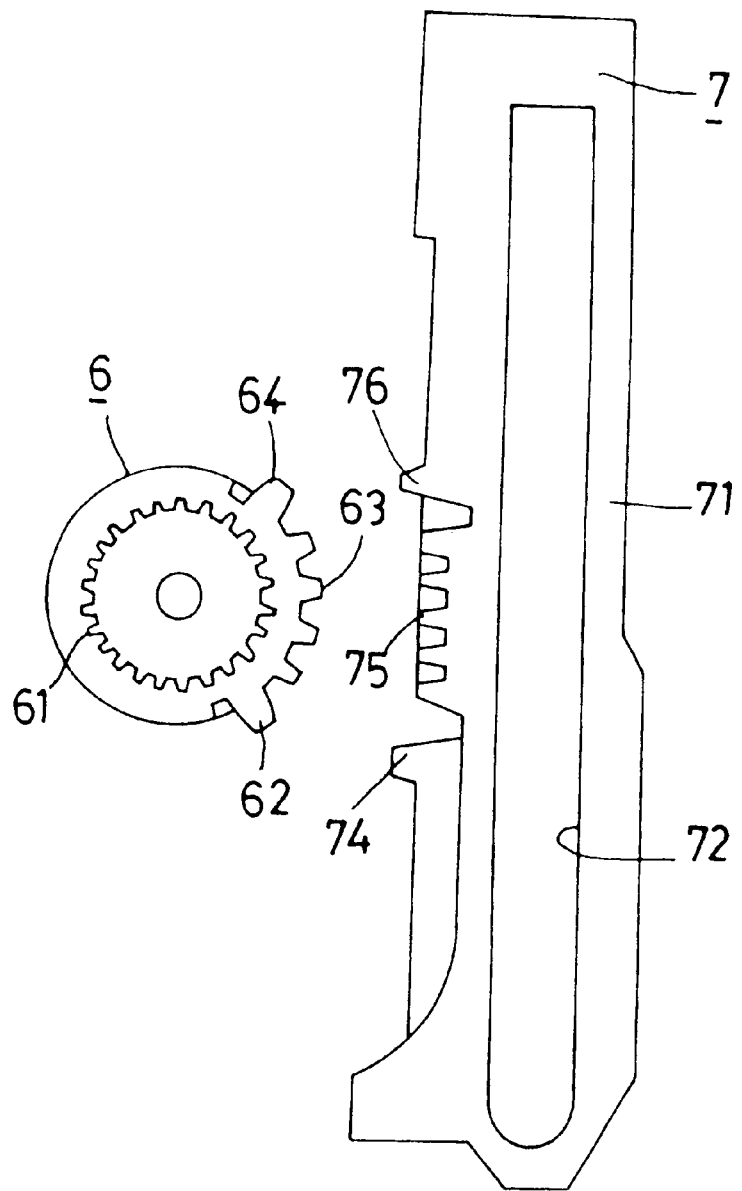
FIG. 8 is a rear view of a drive member and a slide member.
Figure 9:
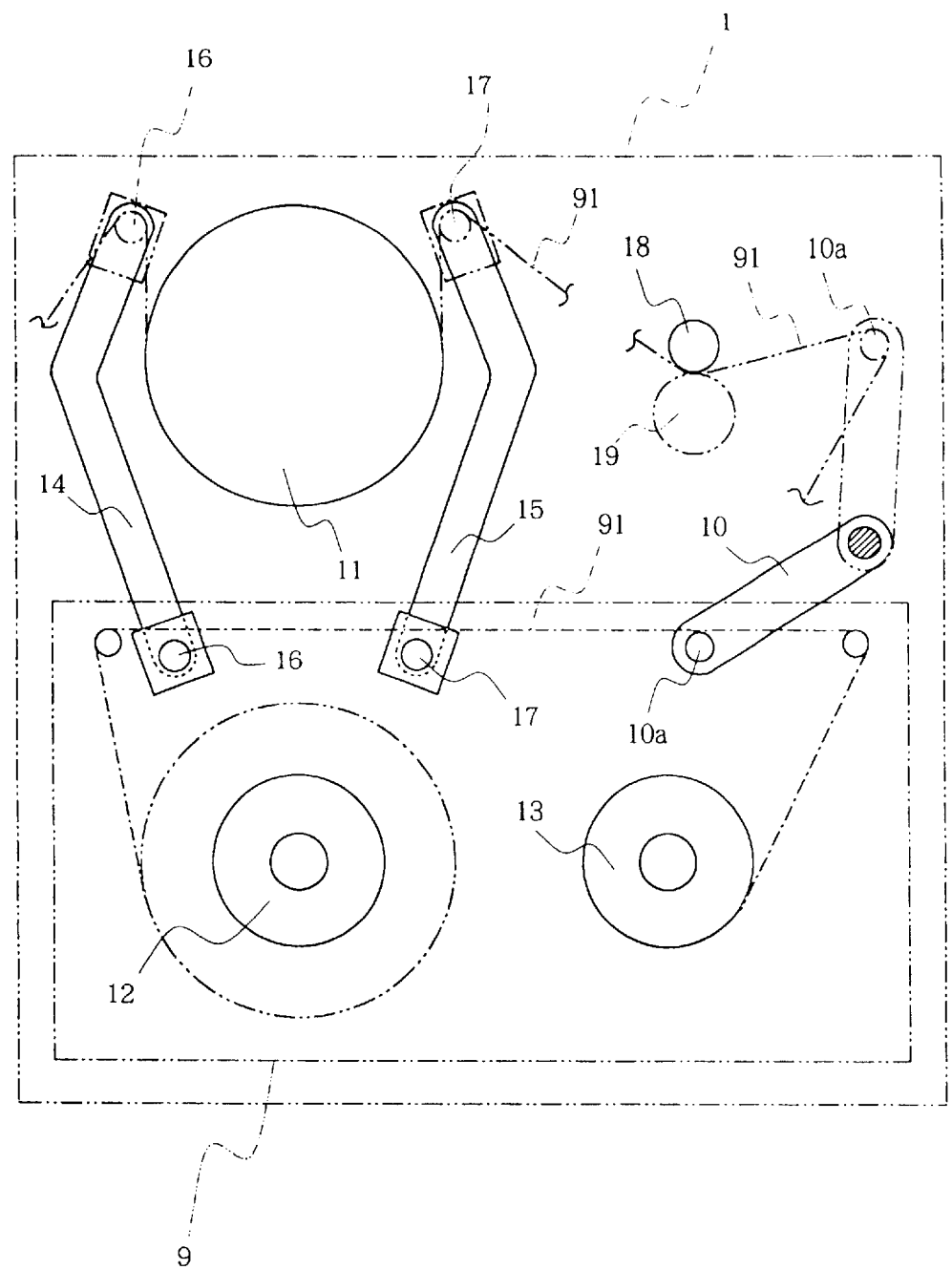
FIG. 9 is a plan view schematically showing the construction of a VCR.
Figure 10:
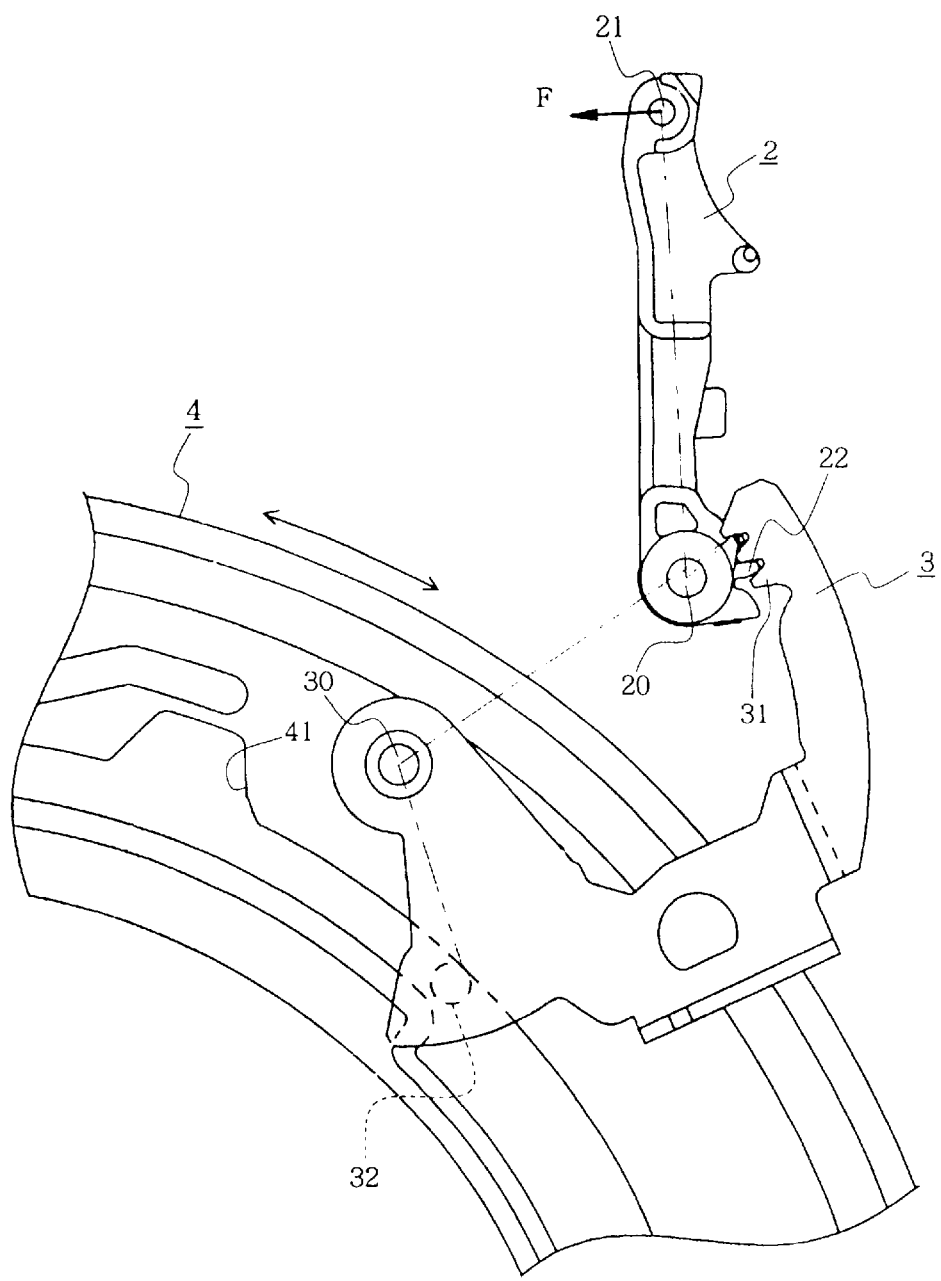
FIG. 10 is a plan view showing a conventional tape drawing-out mechanism.

As seen in FIG. 8, the first pinion tooth 62 and the second pinion tooth 64 on the drive member 6 have a greater height than the intermediate pinion teeth 63, and the first rack tooth 74 and the second rack tooth 76 on the slide member 7 have a greater height than the intermediate rack teeth 75. The first pinion tooth 62 is meshable with the first rack tooth 74, the intermediate pinion teeth 63 with the intermediate rack teeth 75, and the second pinion tooth 64 with the second rack tooth 76.

As shown in FIG. 7, the slide member 7 has a rib 71 extending longitudinally thereof at a position opposed to a side face 55 of the tape drawing-out lever 54.

The slide member 7 further has a vertical wall 73 formed in a side face thereof with a cam groove 77 for driving the pinch roller mechanism 8 upward and downward. The cam groove 77 has a cam curve including an upper horizontal portion, a lower horizontal portion and an intermediate slanting portion interconnecting these portions.

The pinch roller mechanism 8 comprises a boss member 81 having the post 52 on the chassis 5 extending therethrough, and a lever 84 pivotally supported by the same post as the boss member 81. The pinch roller 19 is rotatably supported on a free end of the lever 84. A coil spring 85 extends from the boss member 81 to the lever 84 for biasing the lever 84 clockwise. The boss member 81 is provided with a first cam follower 83 projecting sideways and a second cam follower 82 projecting downward. The first cam follower 83 is engaged in the cam groove 77 in the slide member 7, while the second cam follower 82 is engaged in an ascent-descent guide groove 58 formed in the guide member 59. The guide groove 58 is positioned above the drive member 6, such that with the descent of the pinch roller mechanism 8, the second cam follower 82 is engageable with the cam 65 on the drive member 6 immediately after passing through the guide groove 58.

Figure 1:
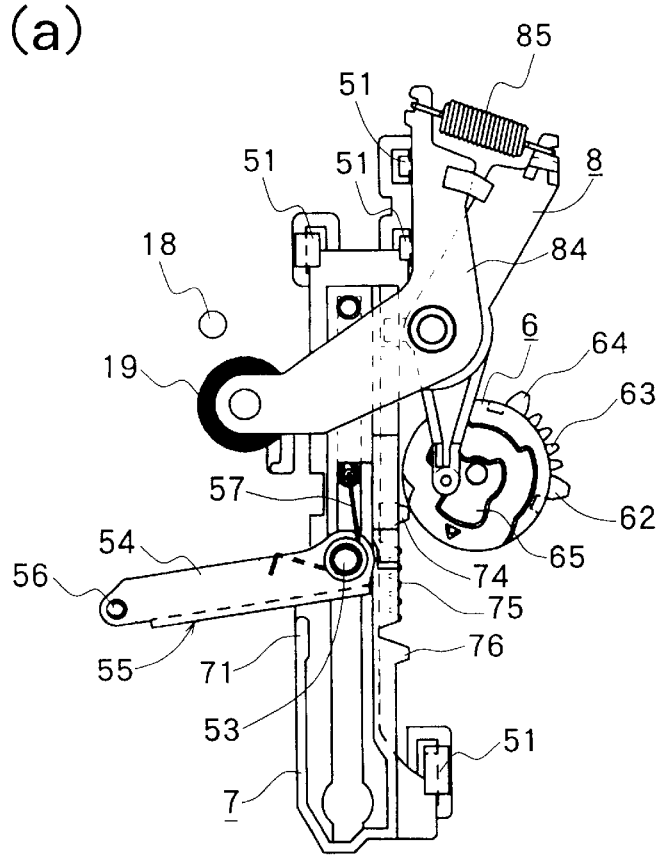
FIGS. 1(a) and 1(b) are a plan view and a right side elevation showing a main assembly included in a VCR embodying the invention in a cassette ejected state.
Figure 1:
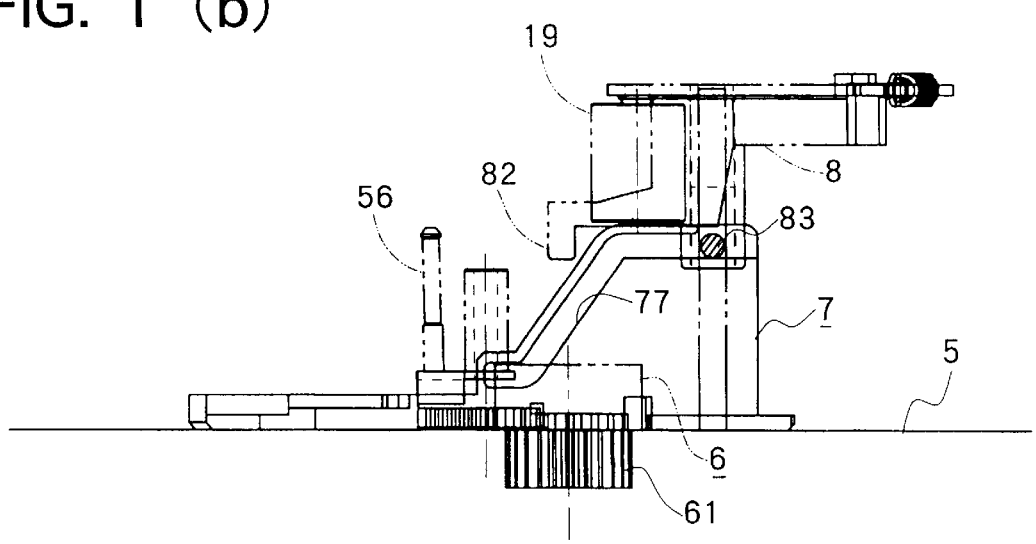
Figure 2:
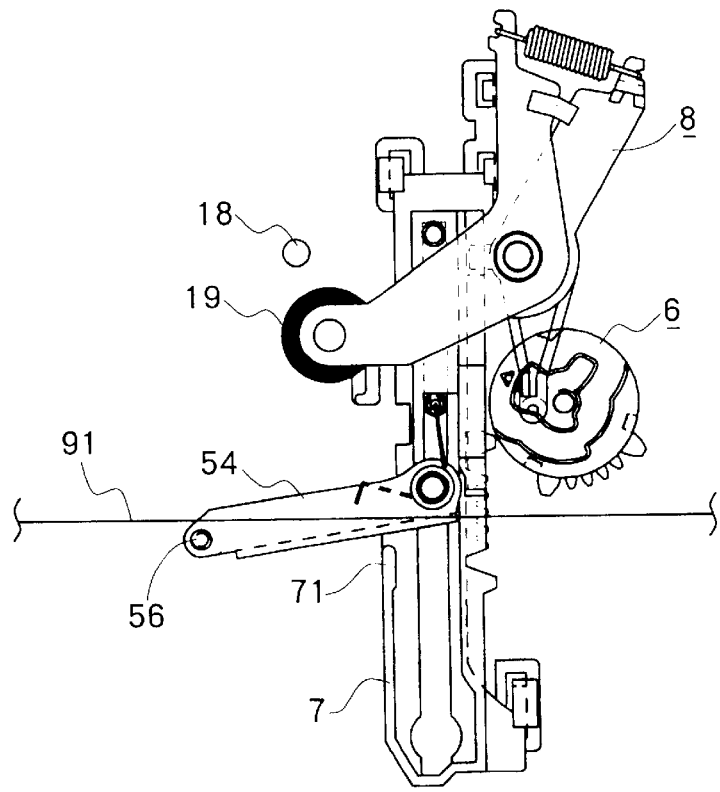
FIGS. 2(a) and 2(b) are a plan view and a right side elevation showing the same with a cassette loaded therein.
Figure 2:
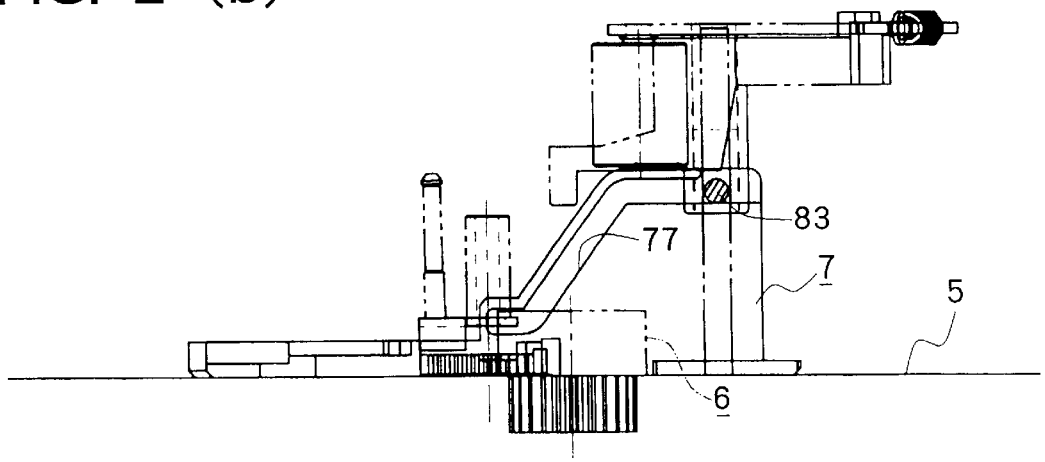
Figure 3:
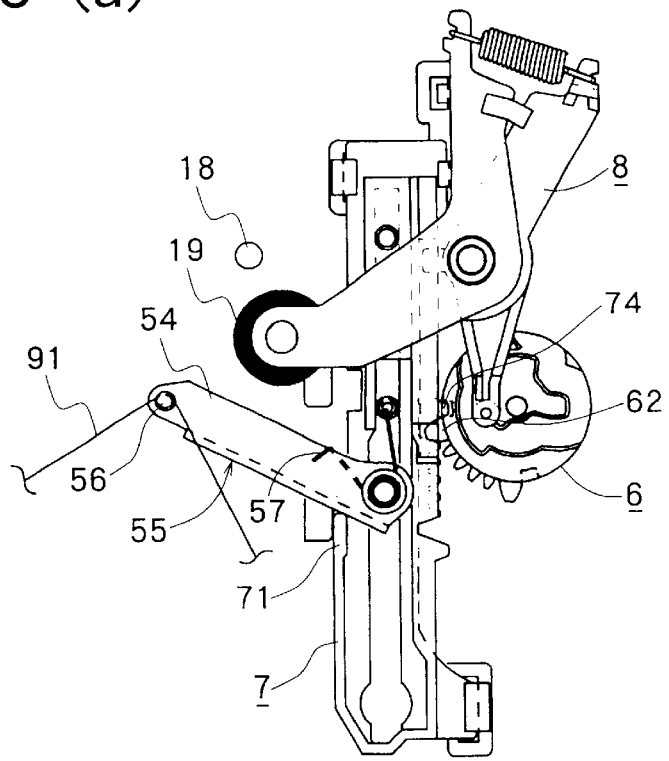
FIGS. 3(a) and 3(b) are a plan view and a right side elevation showing the same while a tape is being drawn out by a tape drawing-out lever.
Figure 3:
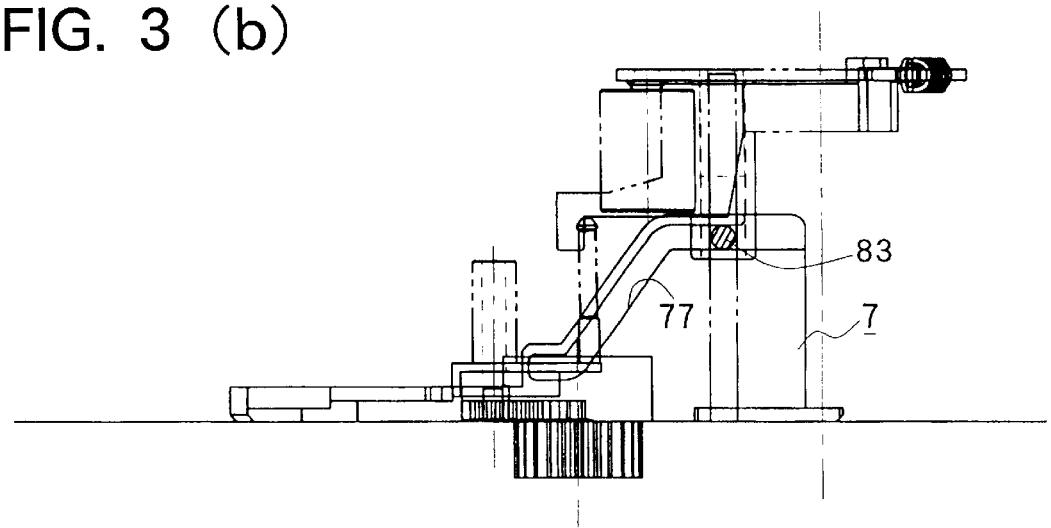
Figure 4:
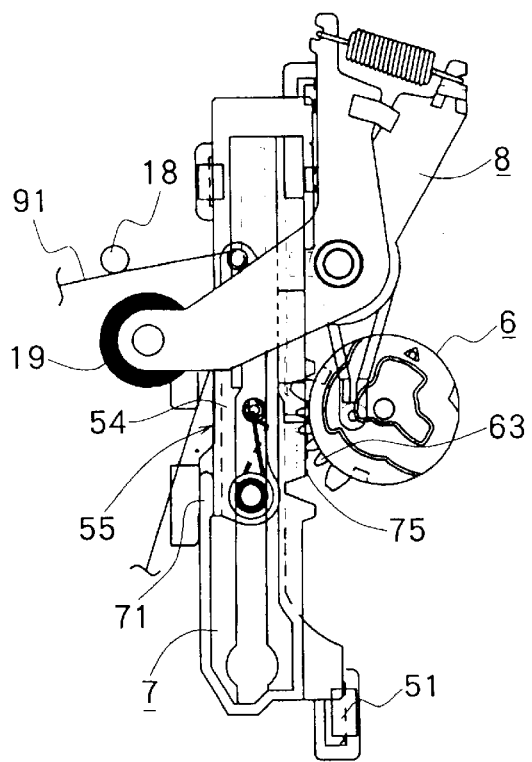
FIGS. 4(a) and 4(b) are a plan view and a right side elevation showing the same when a pinch roller starts to descend after the tape has been drawn out completely.
Figure 4:
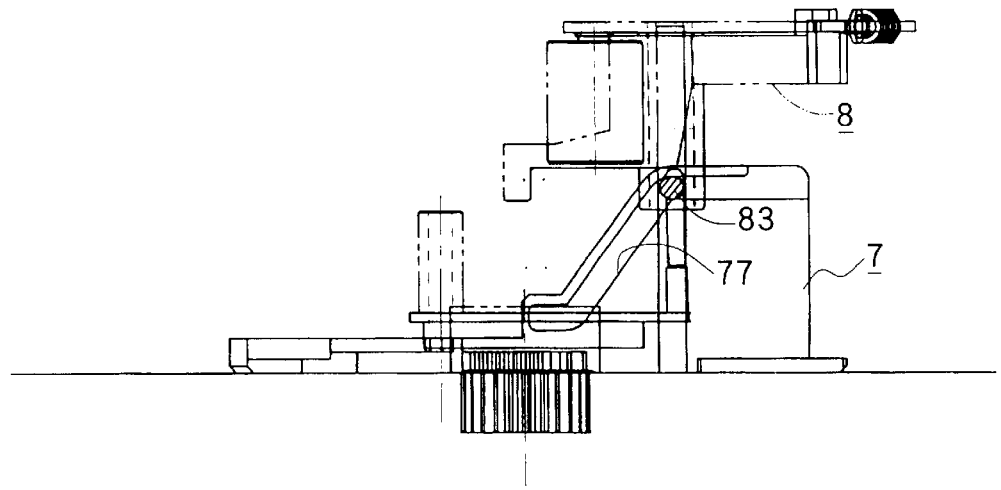
Figure 5:
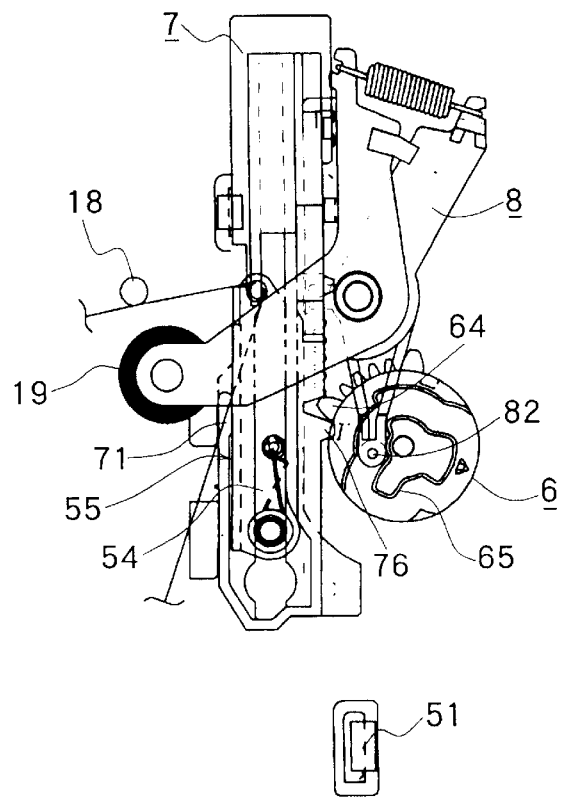
FIGS. 5(a) and 5(b) are a plan view and a right side elevation showing the same on completion of descent of the pinch roller.
Figure 5:
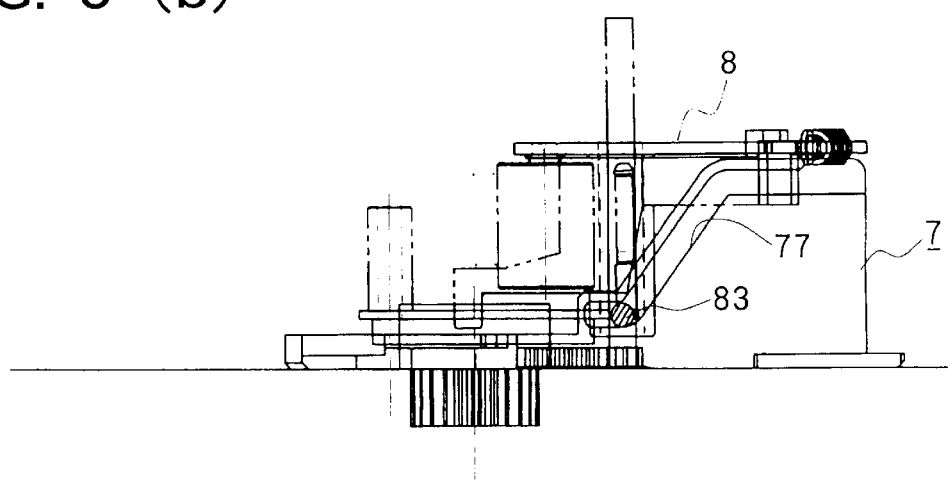
Figure 6:
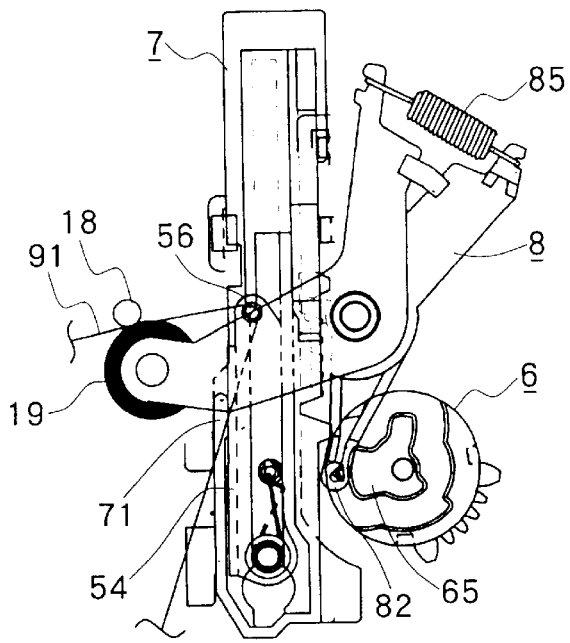
FIGS. 6(a) and 6(b) are a plan view and a right side elevation showing the same in a play mode.
Figure 6:
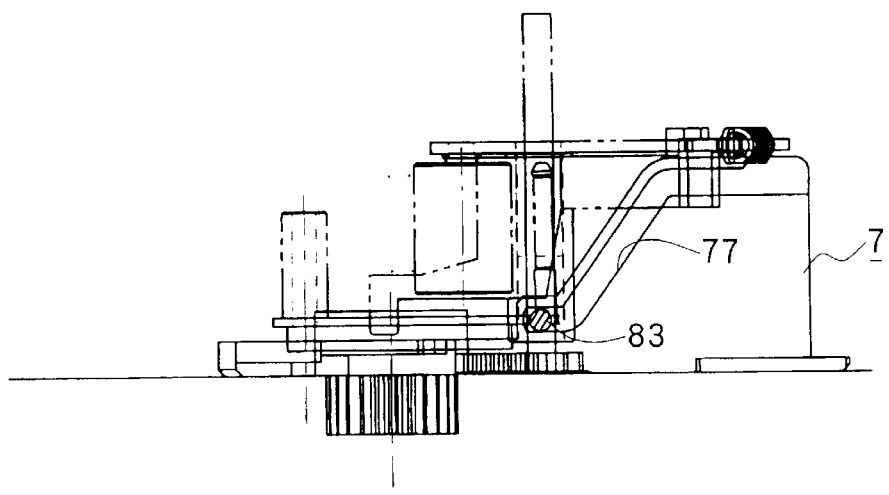

FIGS. 1(a) and 1(b) to FIGS. 6(a) and 6(b) show a sequence of operations of the foregoing recorder components from a state in which the tape cassette has been ejected [FIGS. 1(a) and 1(b)], followed by cassette loaded state [FIGS. 2(a) and 2(b)], state in which the tape is being drawn out by the drawing-out lever 54 [FIGS. 3(a) and 3(b)], state in which the pinch roller 19 starts to descend after the tape has been completely drawn out by the drawing-out lever 54 [FIGS. 4(a) and 4(b)], and completion of the descent of the pinch roller 19 [FIGS. 5(a) and 5(b)], until the recorder is set in play mode by the pinch roller 19 being pressed against the capstan 18 [FIGS. 6(a) and 6(b)].

In the state of FIGS. 1(a) and 1(b) in which the tape cassette has been ejected, the slide member 7 is in a retracted limit position, with the rib 71 positioned away from the side face 55 of the tape drawing-out lever 54. The first pinion tooth 62 of the drive member 6 is positioned away from the first rack tooth 74 of the slide member 7. The pinch roller mechanism 8 is in a raised limit position, as turned to a counterclockwise limit position, with the first cam follower 83 engaged in the upper horizontal portion of the cam groove 77 of the slide member 7 and with the second cam follower 82 engaged in the guide groove 58 of the ascent-descent guide member 59.

When a tape cassette is loaded into the VCR in this state, the tape 91 in the cassette is positioned between the tape drawing-out pin 56 and the pinch roller 19 as shown in FIGS. 2(a) and 2(b).

The drive member 6 is drivingly rotated clockwise from this state, meshing the first pinion tooth 62 of the drive member 6 with the first rack tooth 74 of the slide member 7 as shown in FIGS. 3(a) and 3(b) to thereby start an advance of the slide member 7. As a result, the rib 71 of the slide member 7 pushes the side face 55 of the tape drawing-out lever 54, which is in turn rotated clockwise against the torsion spring 57. This causes the pin 56 to start to draw out the tape.

The drive member 6 is further drivingly rotated clockwise, bringing intermediate pinion teeth 63 of the drive member 6 into meshing engagement with intermediate rack teeth 75 of the slide member 7 to further advance the slide member 7 as shown in FIGS. 4(a) and 4(b). With this movement, the rib 71 of the slide member 7 further pushes the side face 55 of the tape drawing-out lever 54 and turns the lever 54 clockwise. Consequently, the tape is drawn out to a position where the tape comes into contact with the capstan 18, whereby the tape is completely drawn out by the pin 56.

At this time, the first cam follower 83 of the pinch roller mechanism 8 is transferred from the upper horizontal portion of the cam groove 77 of the slide member 7 to the intermediate slanting portion thereof, and a further advance of the slide member 7 causes the slanting portion to drive the first cam follower 83, starting to lower the pinch roller mechanism 8. The second cam follower 82 is guided by the guide groove 58 of the guide member 59, allowing the mechanism 8 to descend vertically.

The second pinion tooth 64 of the drive member 6 then meshes with the second rack tooth 76 of the slide member 7 as shown in FIGS. 5(a) and 5(b), driving the slside member 7 to an advanced limit position, whereby the rib 71 of the slide member 71 is moved from a base end portion of the drawing-out lever 54 toward the free end thereof in sliding contact with its side face 55. At a sliding moved limit position, the rib 71 retains the lever 54 in a tape drawn-out position in bearing contact therewith.

The first cam follower 83 of the pinch roller mechanism 8 is brought from the intermediate slanting portion of the cam groove 77 in the slide member 7 to the lower horizontal portion thereof, completing the descent of the mechanism 8.

Upon the pinch roller mechanism 8 reaching the lowered limit position, the second cam follower 82 of the mechanism 8 moves out of the guide groove 58 of the guide member 59 into engagement with the cam 65 of the drive member 6 below the groove.

The drive member 6 thereafter rotates further clockwise, causing the cam 65 to push the second cam follower 82 of the pinch roller mechanism 8 to rotate the mechanism 8 clockwise, This moves the pinch roller 19 toward the capstan 18, whereby the tape 91 is held between the roller 19 and the capstan 18.

The drive member 6 further rotates from this state, drivingly rotating the pinch roller mechanism 8 to elastically deform the coil spring 85. The elastic restoring force of the coil spring 85 presses the pinch roller 19 against the capstan 18 as shown in FIGS. 6(a) and 6(b) to set the recorder in the play mode.

During the process from the state of FIGS. 5(a) and 5(b) to that of FIGS. 6(a) and 6(b), the second pinion tooth 64 of the drive member 6 moves away from the second rack tooth 76 of the slide member 7, permitting the slide member 7 to remain in the advanced limit position despite the rotation of the drive member 6.

When the drive member 6 as positioned in the play mode of FIGS. 6(a) and 6(b) is rotated counterclockwise, the parts return to the state shown in FIGS. 2(a) and 2(b) through the states of FIGS. 5(a) and 5(b), FIGS. 4(a) and 4(b) and FIGS. 3(a) and 3(b). When the tape cassette is further ejected, the parts resume the state of FIGS. 1(a) and 1(b).

As described above, the VCR embodying the present invention is so adapted that in the play mode shown in FIGS. 6(a) and 6(b), the tape drawing-out lever 54 has a portion thereof, which is toward the free end thereof and away from its base end, retained by the rib 71 of the slide member 7 in bearing contact therewith and is therefore unlikely to turn counterclockwise even if great tension acts on the tape 91 temporarily to exert great counterclockwise torque on the lever 54.

Furthermore, the slide member 7 directly turns the tape drawing-out lever 54 and also directly drives the pinch roller mechanism 8 upward and downward. In addition, the cam 65 integral with the drive member 6 which reciprocatingly drives the slide member 7 presses the pinch roller 19 against the capstan 18. These features render the recorder of the invention smaller in the number of components than the conventional VCR wherein the tape drawing-out lever and the pinch roller are driven by separate members.

The recorder of the present invention is not limited to the foregoing embodiment in construction but can be modified variously without departing from the spirit of the invention as set forth in the appended claims.

What is claimed is:

1. A video cassette recorder comprising a tape drawing-out mechanism having a tape drawing-out lever (54) for drawing out a tape from a video cassette and positioning the tape along a predetermined tape transport path extending around a capstan (18), and a pinch roller mechanism (8) having a pinch roller (19) for pressing the tape against an outer peripheral surface of the capstan (18), the video cassette recorder being characterized in that the recorder comprises a drive member (6) drivingly rotatable by a motor, and a slide member (7) reciprocatingly drivable by the rotation of the drive member (6), the slide member (7) being provided with a pushing portion for pushing a side face (55) of the tape drawing-out lever (54) in sliding contact therewith with a movement of the slide member (7) in one direction to rotate the lever (54) toward a tape drawing-out direction, the slide member (7) and the pinch roller mechanism (8) having engaged portions provided with a cam mechanism for driving the pinch roller (19) toward the capstan (18) with the movement of the slide member (7).

2. A video cassette recorder according to claim 1 wherein the tape drawing-out lever (54) is biased by a spring in a direction opposite to the tape drawing-out direction.

3. A video cassette recorder according to claim 1 wherein the cam mechanism drives the pinch roller mechanism (8) axially of the capstan (18) to reciprocatingly move the pinch roller (19) between a standby position away from the capstan (18) and a position opposed to the capstan (18).

4. A video cassette recorder according to claim 3 wherein cam means is provided between the pinch roller mechanism (8) and the drive member (6), the cam means being engageable when the pinch roller (19) is brought to the position opposed to the capstan (18), and the cam means as engaged presses the pinch roller (19) in the opposed position against the capstan (18) with the rotation of the drive member (6).

* * * * *